United States Patent [19]

Ito et al.

[11] Patent Number: 5,369,132
[45] Date of Patent: Nov. 29, 1994

[54] METHOD FOR PRODUCING A SPHERICAL ACRYLONITRILE CROSSLINKED COPOLYMER

[75] Inventors: Tsuyoshi Ito, Machida; Junya Watanabe, Tokyo; Shintaro Sawada, Yokohama, all of Japan

[73] Assignee: Mitsubishi Kasei Corporation, Tokyo, Japan

[21] Appl. No.: 193,745

[22] Filed: Feb. 9, 1994

Related U.S. Application Data

[62] Division of Ser. No. 45,603, Apr. 9, 1993, Pat. No. 5,314,974.

[30] Foreign Application Priority Data

Apr. 10, 1992 [JP] Japan ................................ 4-91177

[51] Int. Cl.$^5$ ................... C08F 236/20; C08F 220/44
[52] U.S. Cl. ........................ 521/31; 521/33; 525/344; 525/369; 525/329.3
[58] Field of Search ............... 521/31, 33; 525/329.3, 525/344, 369

[56] References Cited

U.S. PATENT DOCUMENTS

3,544,488  12/1970  Corte et al. ........................ 521/31
3,674,728  7/1972  Carbonnel et al. ................ 521/31

FOREIGN PATENT DOCUMENTS

1360169  3/1964  France .
2044630  2/1971  France .
2058529  5/1971  France .
1135130  11/1968  United Kingdom .

OTHER PUBLICATIONS

Patent Abstracts of Japan 7, 219 Sep. 29, 1983, "Cross-linked Rubberg Polymers" (JP 58-117,209A).

*Primary Examiner*—Mark Nagumo
*Attorney, Agent, or Firm*—Oblon, Spivak, McClelland, Maier, & Neustadt

[57] ABSTRACT

A method for producing an acrylonitrile crosslinked copolymer, which comprises copolymerizing, as polymerizable monomers, acrylonitrile, an alkyl ester of acrylic acid or methacrylic acid, an aliphatic or alicyclic crosslinkable unsaturated monomer having at least two allyl groups, and an aromatic crosslinkable polyunsaturated monomer, in the presence of from 10 to 45% by weight, based on the total amount of the polymerizable monomers, of an inert organic solvent having a specific gravity of at least 1.0.

12 Claims, 2 Drawing Sheets

METHOD FOR PRODUCING A SPHERICAL ACRYLONITRILE CROSSLINKED COPOLYMER

This is a division of application Ser. No. 08/045,603, filed on Apr. 9, 1993 now U.S. Pat. No. 5,314,974.

The present invention relates to a method for producing an acrylonitrile copolymer. More particularly, it relates to a method for producing a spherical acrylonitrile crosslinked copolymer having adequate physical strength suitable for use as a base resin for e.g. a weakly acidic cation exchange resin or a chelate resin, whereby the suspension stability during polymerization is improved, by conducting copolymerization of acrylonitrile with a certain specific unsaturated monomer copolymerizable therewith, in the presence of a certain specific inert organic solvent.

The weakly acidic cation exchange resin having carboxyl groups obtained by hydrolyzing an acrylonitrile crosslinked copolymer as a base resin in the presence of an acid or an alkali by a conventional method, is widely used in the fields of e.g. water treatment, metal recovery, alkali-removal, iron-removal, sucrose purification and production of antibiotics, pharmaceuticals and amino acids. In these applications, inclusion of impurities by e.g. breakage of the resin during its use, or the breakage during a treatment for e.g. regeneration of the resin after use, leads so a pressure loss during a production process by means of the ion exchange resin or a reduction of the amount of the effective resin, and thus brings about a disadvantage from the viewpoint of production. Therefore, it is desired that the ion exchange resin has adequate physical strength such as friability and a characteristic excellent in the cycle strength which is strength against alternate loading of an acid and an alkali.

Further, in the production of a spherical acrylonitrile copolymer, particles of irregular shapes formed by instability of the suspension during the polymerization not only lower the yield of the spherical acrylonitrile crosslinked copolymer but also cause the above-mentioned problem due to the breakage of the resin, since particles of irregular shapes are substantially inferior in the physical strength to spherical particles, when they are finally used as an ion exchange resin or a chelate resin. Accordingly, it is desired to develop a method whereby formation of particles of irregular shapes can be minimized.

It is already known to produce a copolymer of acrylonitrile with other unsaturated monomers, for example, an acrylate such as methyl acrylate, ethyl acrylate or butyl acrylate, and a common crosslinkable unsaturated monomer such as divinylbenzene, divinyltoluene, divinylxylene or divinylnaphthalene, in order to modify the physical properties of the ion exchange resin or the chelate resin as the final product (East German Patent No. 79584, which is included in this specification by reference). However, an acrylonitrile crosslinked copolymer obtained by copolymerizing a mixture of acrylonitrile with a common aromatic crosslinkable unsaturated monomer such as divinylbenzene, divinyltoluene, divinylxylene or divinylnaphthalene, is non-uniform in the crosslinkage and contains a non-crosslinked polyacrylonitrile copolymer. Such a non-crosslinked component is known to sluts in e.g. dimethylformamide which is known as a polyacrylonitrile-dissolving solvent. Such an acrylonitrile crosslinked copolymer is not suitable as a base resin for e.g. an ion exchange resin or a chelate resin, and such a copolymer will have no adequate strength because of its non-uniform crosslinked structure.

To obtain an insoluble acrylonitrile crosslinked copolymer, a method has been proposed which comprises copolymerizing a mixture of acrylonitrile with an aliphatic or alicyclic crosslinkable unsaturated monomer having two or more allyl groups such as 1,5-hexadiene, 2-methyl-1,5-hexadiene, 1,6-heptadiene, 1,8-nonadiene, 1,9-decadiene or 1,2,4-trivinylcyclohexane, or such a mixture which further contains an aromatic crosslinkable unsaturated monomer such as divinylbenzene, divinyltoluene, divinylxylene or divinylnaphthalene (Japanese Examined Patent Publication No. 33907/1970 and U.S. Pat. Nos. 3,544,488 and 3,674,728, which are included in this specification by reference). The copolymer obtained by copolymerizing the above-mentioned compound having two or more allyl groups with acrylonitrile and divinylbenzene had no adequate strength for an ion exchange resin or a chelate resin as a final product, since the porous structure is non-uniformly distributed, although its crosslinked structure was more uniform than the copolymer obtained from the acrylonitrile and the divinylbenzene only. Further, undesirable formation of polymer particles of irregular shapes was observed. The above-mentioned Japanese Examined Patent Publication discloses that the mechanical properties of the final product can be modified by adding an additional monomer such as styrene or a (meth)acrylate to acrylonitrile. However, there is no specific case disclosed wherein a (meth)acrylate is used as such an additional monomer.

Further, a hydrocarbon such as white spirit, hydrogenated isobutylene or toluene is known as an inert organic solvent to be used for the production of a spherical acrylonitrile copolymer (U.S. Patent 3,544,488, East German Patent No. 75984 and French Patent No. 1,360,169, which are included in this specification by reference). However, such an organic solvent has a specific gravity lower than water, whereby the dispersion stability tended to be poor, and formation of particles of irregular shapes was observed. Further, non-uniform distribution of the porous structure was observed with some of the products.

It is an object of the present invention to provide a novel method for producing a spherical acrylonitrile crosslinked copolymer having excellent physical strength as a base resin for an ion exchange resin or a chelate resin.

The present inventors have conducted various studies on the problems of the above-mentioned conventional methods and as a result have solved the problems by polymerizing a polymerizable monomer composition comprising acrylonitrile as the main component by a specific method.

The present invention provides a method for producing an acrylonitrile crosslinked copolymer, which comprises copolymerizing, as polymerizable monomers, acrylonitrile, an alkyl ester of acrylic acid or methacrylic acid, an aliphatic or alicyclic crosslinkable unsaturated monomer having at least two allyl groups, and an aromatic crosslinkable polyunsaturated monomer, in the presence cf from 10 to 45% by weight, based on the total amount cf the polymerizable monomers, of an inert organic solvent having a specific gravity of at least 1.0.

Figure 1:
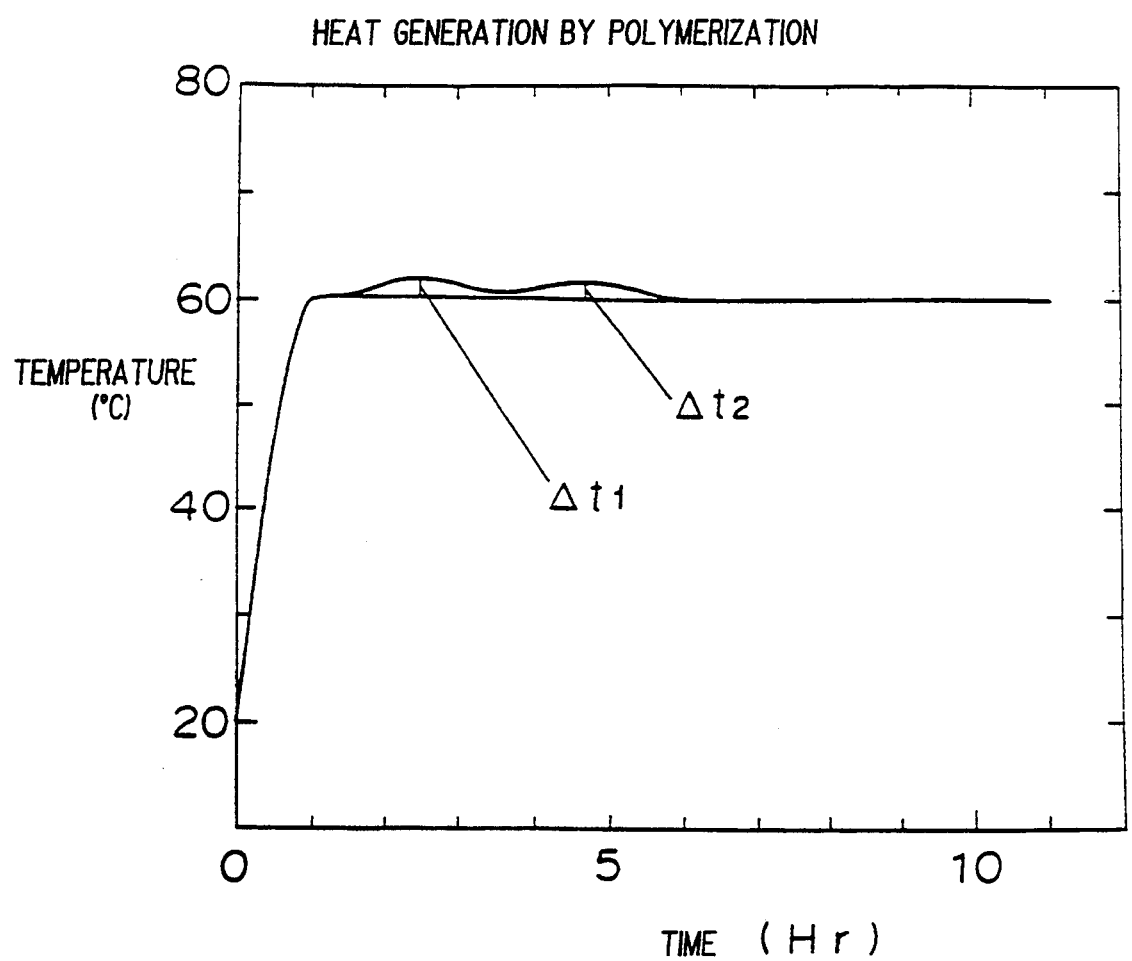
FIG. 1 is a graph showing the heat generation by polymerization against the polymerization time during constant temperature polymerization, wherein the ordinate represents the temperature (° C.), and the abscissa represents the time (hr).

Now, the present invention will be described in detail.

The alkyl ester of acrylic acid or methacrylic acid (hereinafter generally referred to as a (meth)acrylate) to be used in the method of the present invention includes acrylates such as methyl acrylate, ethyl acrylate, butyl acrylate and glycidyl acrylate; and methacrylates such as methyl methacrylate, ethyl methacrylate, butyl methacrylate and glycidyl methacrylate. Preferred is a lower alkyl ($C_{1-4}$) ester, and more preferred is a lower alkyl ester of acrylic acid. Particularly preferred among them is methyl acrylate or ethyl acrylate. These (meth)acrylates may be used in combination as a mixture of two or more of them.

In the present invention, the (meth)acrylate can be used usually in an amount within a range of from 5 to 50% by weight, based on the total weight of the acrylonitrile and the (meth)acrylate. Preferred is an amount within a range of from 10 to 40% by weight. If the amount is less than 5% by weight, heat generation during the polymerization tends to be excessive, which adversely affects the structure of the resulting copolymer, whereby it tends to be difficult to obtain a crosslinked acrylonitrile copolymer useful as a base resin for an ion exchange resin or a chelate resin having a desired physical strength.

As will be shown in Examples and Comparative Examples given hereinafter, heat generation by polymerization can be suppressed by the use of the (meth)acrylate as a component copolymerizable with acrylonitrile in the present invention. By the suppression of heat generation by polymerization, the safety in the operation of the polymerization reaction can be improved, and the strength of the polymer is believed to be improved.

The aliphatic or alicyclic crosslinkable unsaturated monomer having at least two allyl groups to be used in the method of the present invention, is preferably an alkadiene or cycloalkadiene having from 6 to 10 carbon atoms, more preferably from 8 to 10 carbon atoms. Specifically, 1,5-hexadiene, 2-methyl-1,5-hexadiene, 1,6-heptadiene, 1,7-octadiene, 1,8-nonadiene, 1,9-decadiene, 1,5-cyclooctadiene, 1,2,4-trivinylcyclohexane and other compounds disclosed in Japanese Examined Patent Publication No. 33907/1970 (which is included in this specification by reference) may be mentioned. Particularly preferred is 1,7-octadiene. These monomers may be used alone or in combination as a mixture of two or more of them.

Further, in the present invention, an aromatic crosslinkable polyunsaturated monomer such as divinylbenzene, divinyltoluene, divinylxylene or divinylnaphthalene, is also used as a crosslinking agent.

The above aliphatic or alicyclic crosslinkable monomer having at least two allyl groups is used in an amount within a range of from 1 to 10% by weight, preferably from 2 to 5% by weight, based on the total weight of the acrylonitrile, the (meth)acrylate, the aliphatic and alicyclic crosslinkable unsaturated monomer having at least two allyl groups and the aromatic crosslinkable polyunsaturated monomer such as divinylbenzene, i.e. based on the total amount by weight of the polymerizable monomers. The aromatic crosslinkable polyunsaturated monomer such as divinylbenzene is used in an amount within a range of from 2 to 15% by weight, preferably from 4 to 9% by weight, based on the total amount by weight of the polymerizable monomers.

To obtain a spherical polymer intended by the present invention, the above-mentioned polymerizable monomers are copolymerized by suspension polymerization, dispersion polymerization or emulsion polymerization. The copolymer obtained by the present invention is used as a base resin for an ion exchange resin or a chelate resin, and in view of the desired particle size and strength therefor, it is preferred to conduct the copolymerization of the polymerizable monomers in a state of suspension in an aqueous medium containing water as the main component.

The present inventors have found it possible not only to improve the yield in the polymerization by copolymerizing the polymerizable monomers in the presence of a single inert organic solvent or mixed inert organic solvents having a specific gravity of at least 1.0 to suppress the solubility of the monomers in the aqueous medium containing water as the main component, but also to suppress formation of non-spherical particles of irregular shapes by ensuring the stability in the state of suspension.

The inert organic solvent having a specific gravity of at least 1.0 to be used in the method of the present invention, is capable of dissolving the polymerizable monomers but incapable of dissolving the formed crosslinked copolymer. Specifically, it includes halogenated hydrocarbons such as carbon tetrachloride, dichloroethane, dichloropropane, trichloroethane, trichloropropane, chlorobenzene, dichlorobenzene, chloroxylene, bromoethane, dibromoethane and bromobenzene. These halogenated hydrocarbons may be used alone or in combination as a mixture. Among these halogenated hydrocarbons, preferred is the one having an affinity to a linear copolymer of acrylonitrile with the (meth)acrylate. As an index of such an affinity of the halogenated hydrocarbon, a solubility parameter at a level of from 8.5 to 10.5 $(cal/cm^3)^{\frac{1}{2}}$ may be mentioned. Specifically, a dichloroalkane such as 1,2-dichloroethane or 1,2-dichloropropane is preferably employed. Further, such a halogenated hydrocarbon may be used in combination with an aliphatic hydrocarbon such as heptane, hexane or octane; an aromatic hydrocarbon such as toluene or xylene; an aliphatic hydrocarbon such as cyclohexane or cyclohexene; or an ester such as methyl benzoate, ethyl benzoate or butyl benzoate, as the inert organic solvent useful in the present invention, so long as such a mixture satisfies the condition of the specific gravity being at least 1.0. The inert organic solvent having a specific gravity of at least 1.0 is used usually in an amount within a range of from 10 to 45% by weight, preferably from 15 to 40% by weight, based on the total weight of the polymerizable monomers. If the amount is less than 10% by weight, it tends to be difficult to secure the stability in the state of suspension.

In the suspension polymerization employed by the present invention, a suspension stabilizer may be employed. The suspension stabilizer may, for example, be a water-soluble polymer compound such as gelatin, polyvinyl alcohol, methyl cellulose or hydroxyethyl cellulose; or various anionic or cationic surfactants. To control the solubility of the polymerizable monomers in water, a salting-out agent may be added together with such a suspension stabilizer. As such a salting-out agent, sodium chloride, calcium chloride, sodium sulfate or potassium sulfate may, for example, be used. Such salting-out agent is used usually in an amount within a range of from 0.1 to 5.0% by weight, based on the weight of the aqueous phase. In the suspension, the ratio of the monomer mixture to the aqueous phase is such that the weight of the aqueous phase is within a range of from 1 to 5 times the weight of the monomer mixture.

The polymerization catalyst to be used in the preset invention may be a conventional radical polymerization initiator. For example, it may be an azo compound such as azobisisobutyronitrile; or an organic peroxide such as lauroyl peroxide or benzoyl peroxide. The polymerization catalyst is used usually in an amount within a range of from 0.01 to 3.0% by weight, preferably from 0.1 to 2.0% by weight, based on the total amount by weight of the polymerizable monomers charged. The polymerization temperature is selected depending upon the decomposition temperature of the polymerization catalyst and is usually within a range of from 50° to 130° C., preferably from 55° to 80° C. The polymerization reaction is conducted usually at a constant temperature. However, in order to accelerate the polymerization reaction, the temperature may be changed during the reaction. The reaction time for polymerization varies depending upon the polymerization temperature and the type of the catalyst, but the reaction is conducted usually until the reaction is completed. The reaction is usually regarded as completed when the weight of the solid content of the formed polymer no longer increases. The polymerization yield is regarded as the ratio of the weight of the solid content to the weight of the loading monomer mixture.

After completion of the polymerization reaction, the inert organic solvent used for the reaction is removed by a treatment such as distillation or extraction by another solvent. The spherical acrylonitrile crosslinked copolymer thus produced, may be washed and dried, if necessary, and it may be hydrolyzed by a conventional method in the presence of an acid such as sulfuric acid or hydrochloric acid or an alkali such as sodium hydroxide or potassium hydroxide to obtain a weakly acidic cation exchange resin. Specifically, such hydrolysis is preferably conducted in a 40–60% sulfuric acid aqueous solution, in a 15–50% sodium hydroxide aqueous solution or in an alcohol solution such as methanol under a refluxing condition.

When the copolymer particles obtained by the present invention is to be used as a matrix of a weakly acidic cation exchange resin, the particle size of the copolymer particles is preferably adjusted within a range of from 200 to 800 μm, since the particle size of such an ion exchange resin is usually within a range of from 300 to 1000 μm.

According to the method of the present invention, a spherical acrylonitrile crosslinked copolymer suitable for use as a base resin for e.g. an ion exchange resin or a chelate resin having excellent physical strength and containing a less amount of particles of irregular shapes, can be produced as a result of the suppression of the heat generation by polymerization and the improvement in the stability of the suspension as compared with the prior art. When the weakly acidic cation exchange resin obtained from the spherical acrylonitrile crosslinked copolymer is used for an industrial application, breakage of the resin is minimum, and its industrial value is extremely high.

Now, the method of the present invention will be described in further detail with reference to Examples. However, it should be understood that the present invention is by no means restricted to such specific Examples.

EXAMPLE 1

1) Polymerization

Figure 2:
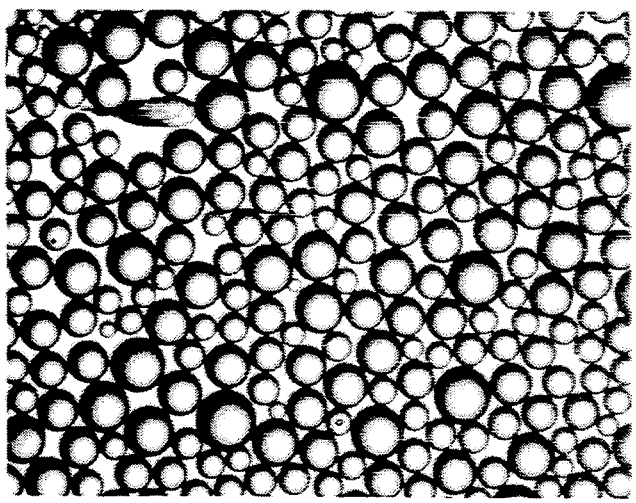
FIG. 2 is a microscopic photograph by transmitted light of the copolymer particles produced in Example 1 (magnification: 12 times)
Figure 3:
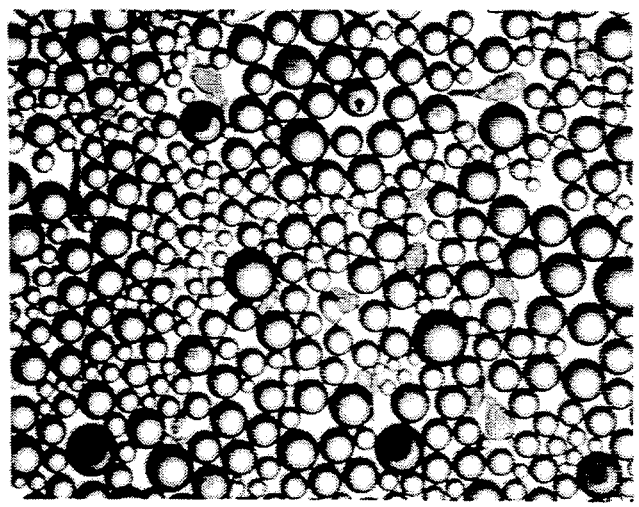
FIG. 3 is a microscopic photograph by transmitted light of the copolymer particles produced in Comparative Example 1 (magnification: 12 times)

Into a 1 l polymerization reactor equipped with a reflux condenser, 500 ml of 0.2 wt% polyvinyl alcohol aqueous solution containing 4 wt% of sodium chloride, was charged, and an organic mixture solution comprising 118.3 g of acrylonitrile, 56.5 g of methyl acrylate, 4.0 g of 1,7-octadiene, 21.2 g of divinylbenzene having a purity of 56% and containing 44% of ethylstyrene, 60 g of 1,2-dichloroethane (specific gravity: 1.256 g/ml) and 2.0 g of benzoyl peroxide having a purity of 75% and containing 25% of water, was added thereto. The mixture was heated to 60° C. over a period of one hour while stirring to maintain it in a suspended state under a nitrogen stream, and then a polymerization reaction was conducted for 10 hours while controlling the temperature at a level of 60° C. After the polymerization reaction, 1,2-dichloroethane was removed by steam distillation. The yield of the obtained acrylonitrile crosslinked copolymer was 93%. The obtained polymer was spherical particles as shown in FIG. 2, and the content of particles of irregular shapes was not more than 1% based on the number of particles. Further, the internal porous structure of each particle was like a uniform gel.

2) Hydrolysis

Into a 0.5 l flask equipped with a reflux condenser, 30 g (dry) of the acrylonitrile crosslinked copolymer obtained by the above polymerization, was charged, and 180 g of 50 wt% sulfuric acid was added thereto. The mixture was heated for 8 hours under stirring under reflux, and methanol as a reaction product was removed from the reaction system by steam distillation. The obtained H-type cation exchange resin was washed until the washing solution became neutral. The obtained weakly acidic ion exchange resin had an alkali adsorption capacity of 4.40 equivalent per liter of the H-type resin. Further, the calculated rate of hydrolysis was 89%. The outer color was slightly yellowish white.

EXAMPLE 2

1) Polymerization

The polymerization was conducted in the same manner as in Example 1 except that the composition of the organic mixture solution in Example 1 was changed to 115.6 g of acrylonitrile, 53.6 g of methyl acrylate, 4.0 g of 1,7-octadiene, 26.6 g of divinylbenzene having a purity of 56% and containing 44% of ethylstyrene, 60 g of 1,2-dichloroethane and 2.0 g of benzoyl peroxide having a purity of 75% and containing 25% of water, and then steam distillation was conducted. The yield of the obtained acrylonitrile crosslinked copolymer was 94.5%.

2) Hydrolysis

The hydrolysis of the copolymer obtained in the above step 1) was conducted in the same manner as in Example The alkali adsorption capacity of the obtained weakly acidic ion exchange resin was 4.55 equivalent per liter of the H-type resin. Further, the calculated rate of hydrolysis was 86%. The outer color was slightly yellowish white.

EXAMPLE 3

1) Polymerization

The polymerization reaction was conducted in the same manner as in Example 1 except that 40 g of 1,2-dichloropropane was used instead of 60 g of 1,2-dichloroethane used in Example 1. Then, 1,2-dichloropropane was removed by steam distillation. The yield of the obtained acrylonitrile crosslinked copolymer was 92.0%.

2) Hydrolysis

The hydrolysis was conducted in the same manner as in Example 1. The obtained weakly acidic ion exchange resin had an alkali adsorption capacity of 4.40 equivalent per liter of the H-type resin. The outer color was slightly yellowish white.

COMPARATIVE EXAMPLE 1

(wherein an inert organic solvent having a specific gravity of at least 1.0 was not used)

Into the same polymerization reactor as used in Example 1, 500 ml of a 0.2 wt% polyvinyl alcohol aqueous solution containing 4 wt% of sodium chloride, was charged, and a mixture comprising 118.3 g of acrylonitrile, 56.5 g of methyl acrylate, 4.0 g of 1,7-octadiene, 21.2 g of divinylbenzene having a purity of 56% and containing 44% of ethylstyrene and 2.0 g of benzoyl peroxide having a purity of 75% and containing 25% of water, was added thereto. Then, the polymerization was conducted in the same manner as in Example 1. The yield of the obtained acrylonitrile crosslinked copolymer was 88.0%. The obtained particles contained a substantial amount of particles of irregular shapes and abnormally large particles having sizes of a few times the average particle size. Such an amount was 5% by weight, based on the total weight of the entire particles. Further, there were a number of particles having non-uniform internal structures. EXAMPLES 4 to 8 and COMPARATIVE EXAMPLE 2 (wherein a (meth)acrylate was not used)

An acrylonitrile crosslinked copolymer was prepared in the same manner as in Example 1 except that the composition of the organic mixture solution was changed as identified in the following Table 1. In Table 1, $\Delta t1$ and $\Delta t2$ (heat generation by polymerization) represent the temperature differences between the prescribed temperature of 60° C. (base line) and the peaks of the heat generation during the constant temperature polymerization, as shown in FIG. 1.

TABLE 1

| | Heat generation by polymerization | | | | | |
|---|---|---|---|---|---|---|
| | Comp Ex 2 | Ex. 4 | Ex. 5 | Ex. 6 | Ex. 7 | EX. 8 |
| AN g | 164.0 | 147.8 | 131.4 | 112.0 | 131.4 | 112.0 |
| MA g | 0 | 16.4 | 32.8 | 52.0 | — | — |
| EA g | — | — | — | — | 32.8 | 52.0 |
| DVB* g | 31.8 | 31.8 | 31.8 | 31.8 | 31.8 | 31.8 |
| 1.7OD g | 4.0 | 4.0 | 4.0 | 4.0 | 4.0 | 4.0 |
| BPO* g | 2.0 | 2.0 | 2.0 | 2.0 | 2.0 | 2.0 |
| EDC g | 60.0 | 60.0 | 60.0 | 60.0 | 60.0 | 60.0 |
| $\Delta t1$ °C. | 1.8 | 1.6 | 1.1 | 1.1 | 1.3 | 1.1 |
| $\Delta t2$ °C. | 1.6 | 1.0 | 0.0 | 0.0 | 1.0 | 0.8 |

In Table 1, the abbreviated symbols have the following meanings.

AN: Acrylonitrile

MA: Methyl acrylate

EA: Ethyl acrylate

DVB*: Purity of 56% (containing 44% of ethyl styrene)

1,7OD: 1,7-Octadiene

EDC: Dichloroethane

BPO*: Purity of 75% (containing 25% of water)

$\Delta T1,2$: Temperature difference between the peak of heat generation and the base line

COMPARATIVE EXAMPLE 3

(wherein a crosslinkable unsaturated monomer having at least two allyl groups and an inert organic solvent having a specific gravity of at least 1.0 were not used)

1) Polymerization

The polymerization was conducted in the same manner as in Example 1 except that the composition of the organic mixture solution in Example 1 was changed to 178.7 g of acrylonitrile, 21.2 g of divinylbenzene having a purity of 56% and containing 44% of ethylstyrene and 2.0 g of benzoyl peroxide having a purity of 75% and containing 25% of water. The yield of the obtained acrylonitrile crosslinked copolymer was 84.2%.

2) Hydrolysis

The hydrolysis of the copolymer obtained in the above step 1) was conducted in the same manner as in Example 1. The obtained weakly acidic ion exchange resin had an alkali adsorption capacity of 3.05 equivalent per liter of the H-type resin. Further, the calculated rate of hydrolysis was 75%. The outer color was milky white.

COMPARATIVE EXAMPLE 4

(wherein a (meth)acrylate and an inert organic solvent having a specific gravity of at least 1.0 were not used)

1) Polymerization

The polymerization was conducted in the same manner as in Example 1 except that the composition of the organic mixture solution in Example 1 was changed to 174.7 g Of acrylonitrile, 4.0 g of 1,7-octadiene, 21.2 g of divinylbenzene having a purity of 56% and containing 44% of ethylstyrene and 2.0 g of benzoyl peroxide having a purity of 75% and containing 25% of water. The yield of the obtained acrylonitrile crosslinked copolymer was 86.2%.

2) Hydrolysis

The hydrolysis of the copolymer obtained in the above step 1) was conducted in the same manner as in Example 1. The obtained weakly acidic ion exchange resin had an alkali adsorption capacity of 4.60 equivalent per liter of the H-type resin. Further, the calculated rate of hydrolysis was 87%. The visual appearance was spherical with mottling of slightly yellowish white portions and transparent portions, and it was found that the polymerization was non-uniform, and portions differing in the porous degree existed in each particle.

Cycle strength test 13 ml (volume prior to the test) of the sieved wet H-type weakly acidic ion exchange resin having a particle size of from 850 to 425 μm was packed in a column. At a flow rate of 6.5 ml/min, a 2N sodium hydroxide solution and deionized water were passed therethrough each for 20 minutes, and then a 2N hydrochloric acid solution and deionized water were passed therethrough each for 20 minutes. Such a liquid flow operation is taken as one cycle, and 50 cycles of the operation were conducted, whereupon the resin was sieved by a screen of 425 μm, and the volume of the remained weakly acidic ion exchange resin of H-type was measured (volume after the test.

On the other hand, the percentage of completely spherical particles in the H-type weakly acidic ion exchange resin particles was taken as a visual appearance index, and such a visual appearance index was obtained before and after the test.

By the foregoing test method, the cycle strength was calculated in accordance with the following equation.

$$\text{Cycle strength} = \frac{\text{Visual appearance index after the test (\%)}}{\text{Visual appearance index before the test (\%)}} \times \frac{\text{Resin volume after the test (ml)}}{\text{Resin volume before the test (ml)}}$$

The cycle strength of the weakly acidic ion exchange resins obtained in Example 1, Example 2 and Comparative Example 3 was 100, 100 and 0, respectively.

Friability

The friability of the sieved wet H-type weakly acidic ion exchange resin having a particle size of 600 μm was measured by a friability measuring device (dial push-pull model DPP, manufactured by John Chatilion & Sons). The results of the measurement are shown in Table 2. The value in the Table is an average value of 30 particles measured. The maximum strength effectively measurable by the measuring device was 2500 g/particle, and a value exceeding this maximum strength was expressed as at least 2500 g/particle. In Example 1 and Comparative Example 4, 1,7-octadiene and divinylbenzene were used in the same amounts.

TABLE 2

| Friability | Ex. 1 | Comp. Ex. 4 |
|---|---|---|
| Average value g/particle | At least 2500 | 1600 |
| Minimum value g/particle | 2500 | 700 |
| Maximum value g/particle | At least 2500 | 2400 |

COMPARATIVE EXAMPLE 5

Copolymer particles were produced in the same manner as in Example 1 except that 19 g of 1,2-dichloroethane was used instead of 60 g of 1,2-dichloroethane in Example 1. The amount of 1,2-dichloroethane was 9.5% based on the total amount of the polymerizable monomers. The obtained polymer contained 5% by weight of particles of irregular shapes, although the internal pore structure was like a uniform gel.

COMPARATIVE EXAMPLE 6

Figure 4:
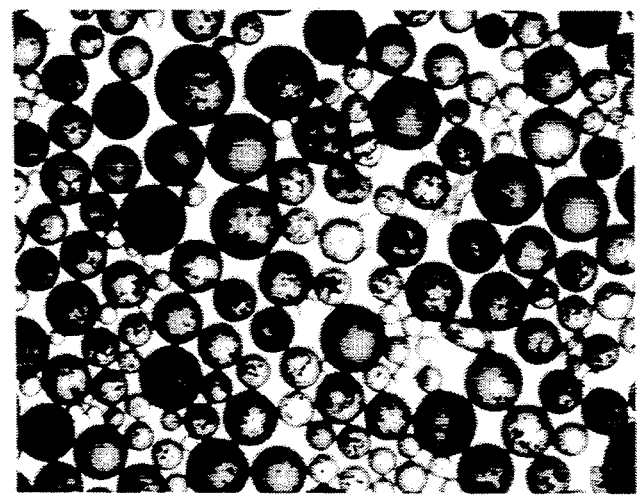
FIG. 4 is a microscopic photograph by transmitted light of the copolymer particles produced in Comparative Example 6 (magnification: 12 times).

Copolymer particles were prepared in the same manner as in Example 1 except that 40 g toluene was used instead of 60 g of 1,2-dichloroethane in Example 1. The amount of toluene was 20.0% based on the total amount of the polymerizable monomers. The obtained polymer particles contained 4% of particles of irregular shapes, as shown in FIG. 4, and a number of particles having non-uniform internal structures were present.

What is claimed is:

1. A method for producing a weakly acidic cation exchange resin, which comprises hydrolyzing an acrylonitrile crosslinked copolymer obtained by copolymerizing, as polymerizable monomers,
   (a) acrylonitrile
   (b) an alkyl ester of acrylic or methacrylic acid
   (c) a crosslinkable aliphatic or alicyclic unsaturated monomer having at least two allyl groups, and
   (d) an aromatic crosslinkable polyunsaturated monomer, in the presence of from 10 to 45% by weight, based on the total amount of the polymerizable monomers of an inert organic solvent having a specific gravity of at least 1.0, wherein the polymerization reaction is conducted in a state of suspension in an aqueous medium containing a suspension stabilizer.

2. The method according to claim 1, wherein the alkyl ester of acrylic acid or methacrylic acid is used in an amount of from 5 to 50% by weight, based on the total amount of the acrylonitrite and the alkyl ester of acrylic acid or methacrylic acid.

3. The method according to claim 1, wherein the alkyl ester of acrylic acid or methacrylic acid is a methyl or ethyl ester of acrylic acid or methacrylic acid.

4. The method according to claim 1, wherein the aliphatic or alicyclic unsaturated monomer having at least two allyl groups is selected from $C_{6-10}$ (cyclo)alkyldienes.

5. The method according to claim 4, wherein the aliphatic or alicyclic crosslinkable unsaturated monomer having at least two allyl groups is a $C_{8-10}$ (cyclo)alkyldiene.

6. The method according to claim 1, wherein the aliphatic or alicyclic crosslinkable unsaturated monomer having at least two allyl groups is used in an amount within a range of from 1 to 10% by weight, based on the total amount of the polymerizable monomers.

7. The method according to claim 1, wherein the aromatic crosslinkable polyunsaturated monomer is used in an amount within a range of from 2 to 15% by weight, based on the total amount of the polymerizable monomers.

8. The method according to claim 1, wherein the inert organic solvent having a specific gravity of at least 1.0 is selected from dichloroalkanes.

9. The method according to claim 8, wherein the inert organic solvent having a specific gravity of at least 1.0 is 1,2-dichloroethane or 1,2-dichloropropane.

10. The method for producing a weakly acidic cation exchange resin according to claim 1, wherein the acrylonitrile crosslinked copolymer is hydrolyzed by using an acid or a base after removal of the organic solvent from the polymerization mixture.

11. The method for producing a weakly acidic cation exchange resin according to claim 10, wherein the hydrolysis is conducted in a 40–60 wt. % sulfuric acid aqueous solution under a refluxing condition.

12. The method for producing a weakly acidic cation exchange resin according to claim 10, wherein the hydrolysis is conducted in a 15–50 wt. % aqueous or alcohol solution of caustic alkali selected from the group consisting of sodium hydroxide and potassium hydroxide, under a refluxing condition.

* * * * *